United States Patent
Toyota et al.

(10) Patent No.: US 6,653,362 B2
(45) Date of Patent: Nov. 25, 2003

(54) PROCESS FOR PRODUCING FLEXIBLE POLYURETHANE FOAM

(75) Inventors: Yoshinori Toyota, Kanagawa (JP); Hiroshi Wada, Ibaraki (JP); Takayuki Sasaki, Ibaraki (JP); Akio Horie, Ibaraki (JP); Kayoko Sugiyama, Kanagawa (JP); Hiromitsu Takeyasu, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 10/265,663

(22) Filed: Oct. 8, 2002

(65) Prior Publication Data

US 2003/0045595 A1 Mar. 6, 2003

Related U.S. Application Data

(63) Continuation of application No. PCT/JP01/03167, filed on Apr. 12, 2001.

(30) Foreign Application Priority Data

Apr. 14, 2000 (JP) .................................. 2000-114330

(51) Int. Cl.[7] ................................................ C08G 18/48
(52) U.S. Cl. ....................... 521/174; 521/124; 521/125; 521/130; 521/131; 521/133
(58) Field of Search ................... 521/124, 125, 521/174, 131, 133, 130

(56) References Cited

U.S. PATENT DOCUMENTS

| | | |
|---|---|---|
| 5,093,380 A | 3/1992 | Takeyasu et al. |
| 5,437,822 A | 8/1995 | Wada et al. |
| 5,605,939 A | 2/1997 | Hager |
| 5,648,559 A | 7/1997 | Hager |
| 5,668,191 A | 9/1997 | Kinkelaar et al. |
| 5,700,847 A | 12/1997 | Thompson |
| 6,008,263 A | 12/1999 | Thompson et al. |

FOREIGN PATENT DOCUMENTS

| | | |
|---|---|---|
| JP | 3-14812 | 1/1991 |
| JP | 3-128914 | 5/1991 |
| JP | 4-59825 | 2/1992 |
| JP | 4-145123 | 5/1992 |
| JP | 7-309924 | 11/1995 |
| JP | 7-330843 | 12/1995 |
| JP | 8-208800 | 8/1996 |
| JP | 8-231676 | 9/1996 |
| JP | 8-231677 | 9/1996 |
| JP | 9-31153 | 2/1997 |
| JP | 9-52932 | 2/1997 |
| JP | 9-59340 | 3/1997 |
| JP | 9-176270 | 7/1997 |
| JP | 9-263621 | 10/1997 |
| JP | 10-251508 | 9/1998 |
| JP | 11-60676 | 3/1999 |
| JP | 11-60721 | 3/1999 |
| JP | 11-106500 | 4/1999 |
| JP | 11-140154 | 5/1999 |
| JP | 11-171961 | 6/1999 |

*Primary Examiner*—John M. Cooney, Jr.
(74) *Attorney, Agent, or Firm*—Oblon, Spivak, McClelland, Maier & Neustadt, P.C.

(57) ABSTRACT

A process for producing a flexible polyurethane foam satisfying low resilience, high vibration absorption and high durability, is presented. A mixture comprising from 95 to 50 mass % of a polyoxyalkylene polyol produced by means of an alkali metal catalyst and from 5 to 50 mass % of a polyoxyalkylene polyol produced by means of a double metal cyanide complex catalyst, is reacted with a polyisocyanate compound in the presence of a catalyst and a blowing agent, to produce a flexible polyurethane foam having a resonance frequency of at most 3.7 Hz, a resonance ratio of at most 3.5 and an impact resilience of at most 70%.

9 Claims, No Drawings

US 6,653,362 B2

1

PROCESS FOR PRODUCING FLEXIBLE POLYURETHANE FOAM

This application is a Continuation of international Application No. PCT/JP01/03167, filed Apr. 12, 2001.

TECHNICAL FIELD

The present invention relates to a process for producing a flexible polyurethane foam having low resilience, high vibration absorption and high durability, whereby the impact resilience, and the resonance frequency and the resonance ratio measured by the methods in accordance with the vibration test methods of the cushion property test methods for automobile seats as stipulated in automobile standards JASO B407-87, are controlled to be within the optimum ranges.

BACKGROUND ART

An automobile seat is basically constituted by a pad made of a flexible polyurethane foam, a spring and a frame material. As a flexible polyurethane foam at the earlier stage, a foam produced by a hot curing method, was used and employed in combination with a spring material. Here, the hot cure foam was prepared by using, as a polyoxyalkylene polyol, one having a relatively low molecular weight, usually at a level of a molecular weight of 3000, and since the reaction was relatively slow, the mold was heated from outside to complete the reaction, whereby relatively intense heating was required, and this is the reason for the naming of "hot cure". Along with an increase of deep foam seats having springs omitted since a few years ago, it has become important to improve the performance of flexible polyurethane seat pads. Particularly, in order to improve the riding comfortableness of seat cushions, it is desired to improve impact resilience, durability and vibration characteristics. With respect to the vibration characteristics, the relation between the car body vibration and human is not uniform, but it has been said to be effective for the improvement of the riding comfortableness to take large damping in a frequency region particularly sensitive to human (which is said to be for example from 4 to 8 Hz or from 6 to 20 Hz).

In order to improve such characteristics, it is considered to be effective to produce a seat cushion by means of a polyoxyalkylene polyol having a molecular weight higher than the conventional ones, and on this basis, a cold cure foam has been developed. The cold cure foam is produced by a method wherein usually one having a molecular weight of at least about 4500 is used, and since the reactivity is relatively high, external heating of the mold is not required as in the case of a hot cure foam, whereby the energy consumption is small. Further, the cold cure foam is referred to also as a HR foam, since it has high resilience similar to a foam rubber.

Usually, a polyoxyalkylene polyol to be used as a starting material for a polyurethane, is produced by ring opening polymerization of an alkylene oxide such as propylene oxide using a polyhydric alcohol as an initiator and employing a sodium type catalyst such as sodium hydroxide or a potassium type catalyst such as potassium hydroxide. In this method, a monool having an unsaturated bond (an unsaturated monool) will be formed as a by-product, and the amount of this unsaturated monool to be formed, increases with an increase of the molecular weight of the polyoxyalkylene polyol (a decrease of the hydroxyl value). With a polyoxyalkylene polyol having a hydroxyl value of about 56 mgKOH/g which is widely used as a starting material for

2 flexible polyurethane foams, the presence of such an unsaturated monool was not a problematic amount. However, with a polyoxyalkylene polyol having a low hydroxyl value having the molecular weight increased, the presence of this unsaturated monool may sometimes be problematic. For example, with a polyoxyalkylene polyol having a hydroxyl value of about 34 mgKOH/g, the unsaturation value will be usually at least 0.1 meq/g. If an elastic foam is produced by means of a polyoxyalkylene polyol having a high total unsaturation value, there will be a problem such as decrease in the hardness, the decrease in the impact resilience, deterioration of the compression set or decrease in the curing property at the time of forming a foam. Further, even if it is attempted to produce a polyoxyalkylene polyol having a low hydroxyl value by means of a sodium type catalyst or a potassium type catalyst, the total unsaturation value tends to be remarkably high, such being practically inacceptable.

Further, in order to improve the above-mentioned characteristics, a method is known to produce a flexible polyurethane foam having high elasticity by means of a polyoxyalkylene polyol having a low total unsaturation value. For example, such is disclosed in JP-A-3-14812 and JP-A-3-128914 i.e. publications of applications by the present applicants. Further, highly elastic flexible polyurethane foams using polyoxyalkylene polyols produced by suing cesium hydroxide as a catalyst, are disclosed in JP-A-9-263621, JP-A-9-59340, JP-A-10-251508, JP-A-7-309924, JP-A-7-330843, and JP-A-8-208800. Further, JP-A-11-60721, JP-A-11-106500 and JP-A-11-140154 disclose that similar effects can be obtained also with a highly elastic flexible polyurethane foam using a polyoxyalkylene polyol produced by using a phosphazenium compound as a catalyst.

However, in recent years, it has been found that with highly elastic flexible polyurethane foams produced by using polyoxyalkylene polyols having low total unsaturation value, the impact resilience is extremely high (from 71 to 90%), and the transmissibility in the vicinity of the resonance frequency of the foams is extremely high, and accordingly, suppression of pushing up feeling or the supporting property for a passenger during driving tends to be inadequate. To solve such a problem, JP-A-11-60676 discloses an invention designed to solve the above problem by reducing the impact resilience of the foams and increasing the value of hysteresis loss to a proper level, by a combination of a polyoxyalkylene polyol produced by using cesium hydroxide as a catalyst with a polyoxyalkylene polyol having a relatively low molecular weight and a hydroxyl value of from 90 to 300 mgKOH/g. However, this literature gives no specific data relating to improvement of the vibration characteristics, which will be an index for driving comfortableness. Further, the hysteresis loss value of the foam disclosed in this literature is relatively large at a level of from 25 to 35%, and such a foam is disadvantageous from the viewpoint of the durability.

On the other hand, JP-A-9-176270 discloses an invention relating to a latex-like flexible polyurethane foam having a relatively small impact resilience, by a combination of a fine polymer particle-dispersed polyol with a hydrophilic polyol, but there is no disclosure relating to the vibration characteristics or durability of this foam. Further, JP-A-9-52932 discloses a method for producing a flexible polyurethane foam using from 2 to 70% of a polyoxyalkylene polyol having ethylene oxide in its molecule, but there is no disclosure relating to the unsaturation value of the polyoxyalkylene polyol, or the vibration characteristics or durability of the foam thereby produced. Likewise, a method for producing a flexible polyurethane foam using a polyoxyalkylene polyol prepared by using a double metal cyanide complex, is disclosed in U.S. Pat. Nos. 5,700,847, 5,668,191, 5,605,939 and 5,648,559, but there is no disclosure relating to the above problem. On the other hand, as a flexible polyurethane foam usually having low transmissibility in the vicinity of the resonance point (usually a resonance ratio of at most 4.0), a hot cure foam is known, and the details of the vibration characteristics are disclosed, for example, on page 199 in Polyurethane Resin Handbook, complied by Keiji Iwata. However, with a hot cure foam, the resonance point is usually within a frequency range sensitive to human (from 4 to 8 Hz), whereby the performance for riding comfortableness has been inadequate. Namely, by the above-mentioned prior art, it has been difficult to produce a flexible polyurethane foam which satisfies all performances of low resilience, high vibration absorption and high durability.

It is an object of the present invention to produce a flexible polyurethane foam which satisfies the respective performances of low resilience, high vibration absorption and high durability.

DISCLOSURE OF THE INVENTION

The present inventors have conducted an extensive study to solve the above problem and as a result have found that a flexible polyurethane foam produced by reacting a polyoxyalkylene polyol comprising both a polyoxyalkylene polyol having a specific structure produced by means of a double metal cyanide complex catalyst and a polyoxyalkylene polyol produced by means of an alkali metal catalyst in a specific ratio, or a fine polymer particle-dispersed polyol using such a polyoxyalkylene polyol as the base polyol, with a specific polyisocyanate compound, satisfies all performances of low resilience, high vibration absorption and high durability, as is different from conventional highly elastic flexible polyurethane foams. The present invention has been accomplished on the basis of this finding.

Namely, the present invention provides a process for producing a flexible polyurethane foam, which comprises reacting the following polyoxyalkylene polyol (C) and the following polyisocyanate compound in the presence of a catalyst and a blowing agent to produce a flexible polyurethane foam having a resonance frequency of at most 3.7 Hz, a resonance ratio of at most 3.5 and an impact resilience of at most 70%:

Polyoxyalkylene polyol (C): a polyoxyalkylene polyol which contains from 0.5 to 45 mass % of a random addition structure of ethylene oxide and an alkylene oxide having a carbon number of at least 3 in its structure and which further contains from 95 to 50 mass % of the following polyoxyalkylene polyol (A) and from 5 to 50 mass % of the following polyoxyalkylene polyol (B);

Polyoxyalkylene polyol (A): a polyoxyalkylene polyol produced by ring opening polymerization of a cyclic ether by means of an alkali metal catalyst;

Polyoxyalkylene polyol (B): a polyoxyalkylene polyol produced by ring opening polymerization of a cyclic ether by means of a double metal cyanide complex at least partially as a polymerization catalyst;

Polyisocyanate compound: a polyisocyanate compound containing from 0 to 50 mass % in total of a diphenylmethane diisocyanate and/or a polymethylenepolyphenyl isocyanate.

Further, the present invention provides the above-mentioned process for producing a flexible polyurethane foam, wherein the polyoxyalkylene polyol (C) is a fine polymer particle-dispersed polyol.

Further, the present invention provides the above-mentioned process for producing a flexible polyurethane foam, wherein the content of the fine polymer particles dispersed in the polyoxyalkylene polyol (C) is from 3 to 50 mass %.

Further, the present invention provides the above-mentioned process for producing a flexible polyurethane foam, wherein the polyoxyalkylene polyol (A) has from 2 to 6 functional groups and a hydroxyl value of from 10 to 45 mgKOH/g.

Further, the present invention provides the above-mentioned process for producing a flexible polyurethane foam, wherein the polyoxyalkylene polyol (B) has an unsaturation value of at most 0.04 meq/g, from 2 to 6 functional groups and a hydroxyl value of from 16 to 45 mgKOH/g, and has from 10 to 60 mass % of a random addition structure of ethylene oxide and propylene oxide in its structure.

Further, the present invention provides the above-mentioned process for producing a flexible polyurethane foam, wherein the polyoxyalkylene polyol (C) has an unsaturation value of at most 0.09 meq/g, from 2 to 6 functional groups and a hydroxyl value of from 10 to 45 mgKOH/g.

Further, the present invention provides the above-mentioned process for producing a flexible polyurethane foam, wherein the total content of oxyethylene groups in the structure of the polyoxyalkylene polyol (C) is from 3 to 80 mass %.

Further, the present invention provides the above-mentioned process for producing a flexible polyurethane foam, wherein the core density of the flexible polyurethane foam is at most 55 kg/m$^3$.

Further, the present invention provides the above-mentioned process for producing a flexible polyurethane foam, wherein the blowing agent is at least one member selected from water and an inert gas.

BEST MODE FOR CARRYING OUT THE INVENTION

The polyoxyalkylene polyol (C) to be used in the present invention contains both a polyoxyalkylene polyol (A) and a polyoxyalkylene polyol (B). The polyoxyalkylene polyol (A) is a polyoxyalkylene polyol produced by ring opening polymerization of a cyclic ether by means of an alkali metal catalyst. The polyoxyalkylene polyol (B) is a polyoxyalkylene polyol produced by ring opening polymerization of a cyclic ether at least partially by means of a double metal cyanide complex catalyst. The polyoxyalkylene polyol (A) and the polyoxyalkylene polyol (B) may, respectively, be one type or a mixture of two or more types.

As the above cyclic ether, an alkylene oxide having at least two carbon atoms, is preferred. Specifically, ethylene oxide, propylene oxide, 1,2-epoxybutane or 2,3-epoxybutane, may, for example, be mentioned. Particularly preferred is a combined use of ethylene oxide and at least one member selected from propylene oxide 1,2-epoxybutane and 2,3-epoxybutane, and more preferred is a combined use of ethylene oxide and propylene oxide.

The polyoxyalkylene polyol (C), i.e. at least one of the polyoxyalkylene polyol (A) and the polyoxyalkylene polyol (B), contains oxyethylene groups in the structure (in the molecule or at the terminal thereof). It is particularly preferred to contain oxyethylene groups at the molecular terminals. A polyoxyalkylene polyol containing oxyethylene groups in its structure may be produced by mixing ethylene oxide and an alkylene oxide having at least three carbon atoms sequentially or at once to a polyvalent initiator for ring opening polymerization. Particularly, a polyoxyalkylene polyol containing oxyethylene groups at the molecular terminals can be produced by the above-mentioned ring opening polymerization, followed further by ring opening polymerization of ethylene oxide. An average content of oxyethylene groups in the structure of the polyoxyalkylene polyol (C) i.e. in the structures of the polyoxyalkylene polyol (A) and the polyoxyalkylene polyol (B), is preferably at least 3 mass %, particularly preferably at least 5 mass %. Further, the upper limit is preferably at most 80 mass %, particularly preferably at most 70 mass %.

Further, the polyoxyalkylene polyol (C) of the present invention, i.e. at least one of the polyoxyalkylene polyol (A) and the polyoxyalkylene polyol (B), contains a random addition structure of ethylene oxide and an alkylene oxide having a carbon number of at least 3. The average content of the random addition structure of ethylene oxide and an alkylene oxide having a carbon number of at least 3, in the structure of the polyoxyalkylene polyol (C), i.e. in the structures of the polyoxyalkylene polyol (A) and the polyoxyalkylene polyol (B), is from 0.5 to 45 mass %, preferably from 0.5 to 40 mass %, particularly preferably from 1 to 35 mass %. Further, the alkylene oxide having a carbon number of at least 3 is preferably propylene oxide. Particularly, the content of the above random addition structure in the structure of the polyoxyalkylene polyol (B) is preferably from 10 to 60 mass %, more preferably from 10 to 50 mass %, particularly preferably from 10 to 40 mass %.

In a broad sense, the random addition structure means the structure of a polyoxyalkylene polyol obtained by mixing ethylene oxide and an alkylene oxide having a carbon number of at least 3 in a predetermined ratio, followed by introducing the mixture into a reactor and subjecting it to ring opening polymerization. In the obtained random addition structure, fine block structures of oxyethylene groups and oxyalkylene groups having a carbon number of at least 3, are also contained. The mixing ratio of ethylene oxide to the alkylene oxide having a carbon number of at least 3 (mass ratio: ethylene oxide/alkylene oxide having a carbon number of at least 3) may theoretically be within a range of from 1/99 to 99/1. However, from the difference in the reactivity between them at the time of ring opening polymerization, it is preferably within a range of from 1/99 to 80/20.

As the polyvalent initiator to be used for the polyoxyalkylene polyol (A) and the polyoxyalkylene polyol (B), a polyhydric alcohol, a polyhydric phenol, a polyamine or an alkanolamine, may, for example, be mentioned. The number of active hydrogen of the initiator is preferably from 2 to 6. In the present invention, the number of hydroxyl groups in the polyoxyalkylene polyol means the number of active hydrogen in the initiator.

Specific examples of the polyvalent initiator include ethylene glycol, diethylene glycol, propylene glycol, dipropylene glycol, neopentyl glycol, 1,4-butanediol, 1,6-hexanediol, glycerol, sorbitol, trimethylolpropane, pentaerythritol, diglycerol, dextrose, sucrose, bisphenol A, ethylene diamine, aminoethylpiperazine and a polyoxyalkylene polyol having a low molecular weight obtained by adding a small amount of an alkylene oxide thereto. These initiators may be used alone or in combination as a mixture of two or more of them. A particularly preferred polyvalent initiator is polyhydric alcohol.

The alkali metal catalyst to be used for the production of the polyoxyalkylene polyol (A) in the present invention, may, for example, be sodium metal, potassium metal or cesium metal; an alkali metal alkoxide such as sodium methoxide, sodium ethoxide, sodium propoxide, potassium methoxide, potassium ethoxide, potassium propoxide, cesium methoxide, cesium ethoxide or cesium propoxide; an alkali metal hydroxide such as sodium hydroxide, potassium hydroxide or cesium hydroxide; or an alkali metal carbonate such as sodium carbonate, potassium carbonate or cesium carbonate. The hydroxyl value of the polyoxyalkylene polyol (A) is preferably at most 100 mgKOH/g, particularly preferably from 20 to 60 mgKOH/g.

In the present invention, the double metal cyanide complex to be used as a catalyst for the production of the polyoxyalkylene polyol (B) having a low unsaturation value, is preferably a complex containing zinc hexacyanocobaltate as the main component, more preferably its ether and/or alcohol complex. As the composition, the ones which are described in JP-B-46-27250, may substantially be employed. The ether may, for example, be preferably ethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME). The alcohol is preferably tert-butyl alcohol as disclosed in JP-A-4-145123. Further, the above complex may have a mixture of the ether and the alcohol as a ligand.

At the time of producing the polyoxyalkylene polyol (B), if the polymerization initiator (the initiator) is of a low molecular weight, there will be a problem that the reaction of the cyclic ether is very slow, and a method disclosed in JP-A-4-59825 is effective wherein a polyoxyalkylene polyol having propylene oxide preliminarily addition polymerized, is used as its polymerization initiator. The polyoxyalkylene polyol which can be used as the polymerization initiator, includes one having a random addition structure of propylene oxide and ethylene oxide.

The hydroxyl value of the polyoxyalkylene polyol (B) is preferably at most 100 mgKOH/g. Further, from the relation between the viscosity and the mechanical properties (particularly the elongation property) of the resulting urethane foam, it is more preferably from 16 to 45 mgKOH/g, particularly preferably from 25 to 40 mgKOH/g. The unsaturation value of the polyoxyalkylene polyol (B) is preferably at most 0.04 meq/g, particularly preferably at most 0.03 meq/g. It is also preferred to use two or more types in combination so that the polyoxyalkylene polyol (B) will substantially have an unsaturation value of at most 0.04 meq/g, from 2 to 6 functional groups and a hydroxyl value of from 16 to 45 mgKOH/g. The mixing ratio of the polyoxyalkylene polyol (A) to the polyoxyalkylene polyol (B) is such that the mass ratio ((A)/(B)) is within a range of from 95/5 to 50/50, preferably within a range of from 95/5 to 70/30, particularly preferably within a range of from 90/10 to 80/20.

In the present invention, as the polyoxyalkylene polyol (C), a fine polymer particle-dispersed polyol using the polyoxyalkylene polyol (C) as the base polyol, may be used. Further, it is possible to obtain a polyoxyalkylene polyol (C) having fine polymer particles stably dispersed, by preparing a fine polymer particle-dispersed polyol using the polyoxyalkylene polyol (A) as the base polyol and then mixing it with the polyoxyalkylene polyol (B). Further, likewise, it is possible to obtain a polyoxyalkylene polyol (C) having fine polymer particles stably dispersed by preparing a fine polymer particle-dispersed polyol using the polyoxyalkylene polyol (B) as the base polyol and then mixing it with the polyoxyalkylene polyol (A).

The fine polymer particle-dispersed polyol is a dispersion system where fine polymer particles (dispersoid) are stably dispersed in a polyoxyalkylene polyol as the base polyol (dispersing medium). The polymer for the fine polymer particles, may, for example, be an addition polymerization type polymer or a polycondensation type polymer. Specific examples include an addition polymerization type polymer such as a homopolymer or copolymer of acrylonitrile, styrene, methacrylate, acrylate or another vinyl monomer; and a polycondensation type polymer such as polyester, polyurea, polyurethane or melamine. By the presence of such fine polymer particles, the hydroxyl value of the entire fine polymer particle-dispersed polyol tends to be usually lower than the hydroxyl value of the matrix polyol.

The content of the fine polymer particles in the polyoxyalkylene polyol is preferably at most 50 mass %. The amount of the fine polymer particles is not required to be particularly large, and if it is too large, there is no particular disadvantage other than the economical one. In many cases, it is preferably from 3 to 50 mass %, particularly preferably from 3 to 35 mass %. The presence of the fine polymer particles in the polyoxyalkylene polyol is effective for the improvement of the hardness, air permeability and other physical properties of the foam. Further, in the calculation of the mass of the polyoxyalkylene polyol, the mass of the fine polymer particles is not included.

The above polyoxyalkylene polyol (C) may be used in combination with a high molecular weight polyamine having at least two primary or secondary amino groups or a high molecular weight compound having at least one primary or secondary amino group and at least one hydroxyl group, as another high molecular weight active hydrogen compound.

Such another high molecular weight active hydrogen compound has a molecular weight of at least 400, particularly at least 800, per functional group, and the number of functional groups per one molecule is preferably from 2 to 8. Further, the molecular weight per functional group is preferably at most 5000.

Such another high molecular weight active hydrogen compound may, for example, be a compound obtained by converting some or all of hydroxyl groups of the above-mentioned polyoxyalkylene polyol, to amino groups, or a compound obtained by hydrolyzing and converting to an amino group the isocyanate group of a prepolymer having the isocyanate group at the terminal, obtained by reacting a polyoxyalkylene polyol with an excess equivalent of a polyisocyanate compound. In a case where the high molecular weight active hydrogen compound capable of being used in combination with the above polyoxyalkylene polyol, is used, its amount is preferably at most 40 mass %, particularly preferably at most 20 mass %, based on the total of both.

In the present invention, a crosslinking agent may be used, as the case requires. As the crosslinking agent, a crosslinking agent having a molecular weight of at most 1000 and from 2 to 8 active hydrogen-containing groups, is preferred. The crosslinking agent may, for example, be a compound having at least two functional groups selected from hydroxyl groups, primary amino groups and secondary amino groups. The crosslinking agents may be used alone or in combination as a mixture of two or more of them.

The crosslinking agent having hydroxyl groups preferably has from 2 to 8 hydroxyl groups, and it may, for example, be a polyol such as a polyhydric alcohol, a low molecular weight polyoxyalkylene polyol obtainable by adding an alkylene oxide to a polyhydric alcohol, or a polyol having a tertiary amino group.

Specific examples of the crosslinking agent having hydroxyl groups, include ethylene glycol, 1,4-butanediol, neopentyl glycol, 1,6-hexane diol, diethylene glycol, triethylene glycol, dipropylene glycol, monoethanolamine, diethanolamine, triethanolamine, glycerol, N-alkyldiethanol, a bisphenol A/alkylene oxide adduct, a glycerol/alkylene oxide adduct, a trimethylolpropane/alkylene oxide adduct, a pentaerythritol/alkylene oxide adduct, a sorbitol/alkylene oxide adduct, a sucrose/alkylene oxide adduct, an aliphatic amine/alkylene oxide adduct, an alicyclic amine/alkylene oxide adduct, a heterocyclic polyamine/alkylene oxide adduct, and an aromatic amine/alkylene oxide adduct, but are not limited thereto.

The heterocyclic polyamine/alkylene oxide adduct is obtained by adding an alkylene oxide to e.g. piperazine, a short chain alkyl-substituted piperazine such as 2-methylpiperazine, 2-ethylpiperazine, 2-butylpiperazine, 2-hexylpiperazine, 2,5-, 2,6-, 2,3- or 2,2-dimethylpiperazine, or 2,3,5,6- or 2,2,5,5-tetramethylpiperazine, or an aminoalkyl-substituted piperazine such as 1-(2-aminoethyl)piperazine.

The amine type crosslinking agent having primary amino groups or secondary amino groups, may, for example, be an aromatic polyamine, an aliphatic polyamine or an alicyclic polyamine.

As the aromatic polyamine, an aromatic diamine is preferred. As the aromatic diamine, preferred is an aromatic diamine having at least one substituent selected from alkyl groups, cycloalkyl groups, alkoxy groups, alkylthio groups and electron attractive groups, on the aromatic nucleus to which amino groups are bonded, and particularly preferred is a diaminobenzene derivative. The above substituents except for electron attractive groups, are preferably such that from 2 to 4 such groups are bonded to the aromatic nucleus to which amino groups are bonded, particularly preferably such that at least one, preferably all of the o-positions to the bonding sites of the amino groups, are bonded.

With respect to the electron attractive groups, it is preferred that one or two are bonded to the aromatic nucleus to which amino groups are bonded. An electron attractive group and another substituent may be bonded to the aromatic nucleus. The carbon numbers of the alkyl group, the alkoxy group and the alkylthio group are preferably at most 4, and the cycloalkyl group is preferably a cyclohexyl group. The electron attractive group may, for example, be preferably a halogen atom, a trihalomethyl group, a nitro group, a cyano group or an alkoxycarbonyl group, particularly preferably a chlorine atom, a trifluoromethyl group or a nitro group.

The aliphatic polyamine may, for example, be a diaminoalkane or a polyalkylene polyamine having at most 6 carbon atoms, or a polyamine obtainable by converting some or all of hydroxyl groups of a low molecular weight polyoxyalkylene polyol, to amino groups. Further, a polyamine having an aromatic nucleus, such as an aromatic compound having at least two aminoalkyl groups, an aromatic compound having a total of at least two alkylamino groups, and such an aromatic compound having the above-mentioned substituents, may also be used. The alicyclic polyamine may, for example, be a cycloalkane having at least two amino groups and/or aminoalkyl groups.

Specific examples of the amine type crosslinking agent include 3,5-diethyl-2,4(2,6)-diaminotoluene (DETDA), 2-chloro-p-phenylenediamine (CPA), 3,5-dimethylthio-2,4 (or 2,6)-diaminotoluene, 1-trifluoromethyl-3,5-diaminobenzene, 1-trifluoromethyl-4-chloro-3,5- diaminobenzene, 2,4-toluenediamine, 2,6-toluenediamine, bis(3,5-dimethyl-4-aminophenyl)methane, 4,4-diaminodiphenylmethane, ethylenediamine, m-xylenediamine, 1,4-diaminohexane, 1,3-bis(aminomethyl)cyclohexane and isophoronediamine, but are not limited thereto. Particularly preferred is a diaminobenzene derivative such as diethyltoluenediamine (i.e. one type or a mixture of two or more types of 3,5-diethyl-2,4(or 2,6)-diaminotoluene), dimethylthiotoluenediamine, monochlorodiaminobenzene or trifluoromethyldiaminobenzene.

The amount of the crosslinking agent to be used, is preferably from 0.1 to 10 mass %, per 100 parts by mass of the polyoxyalkylene polyol.

The polyisocyanate compound may, for example, be an aromatic polyisocyanate compound having at least two isocyanate groups, or a mixture of two or more such compounds, and a modified polyisocyanate obtained by modifying such a compound. Specifically, it may, for example, be a polyisocyanate such as tolylene diisocyanate (TDI), diphenylmethane diisocyanate (MDI) or polymethylenepolyphenyl isocyanate (so-called crude MDI), or a prepolymer type modified product, a isocyanurate modified product, a urea modified product or a carbodiimide modified product thereof. The polyisocyanate compound is preferably a polyisocyanate wherein at most 50 mass % of the polyisocyanate component is a diphenylmethane diisocyanate type polyisocyanate and/or a polymethylene polyphenyl isocyanate type polyisocyanate. If the diphenylmethane diisocyanate type polyisocyanate and/or the polymethylene polyphenyl isocyanate exceeds 50 mass %, the physical properties such as durability, the touch of the foam, etc., may sometimes deteriorate. As the polyisocyanate compound, it is particularly preferred that more than 50 mass % of the polyisocyanate component is tolylene diisocyanate.

The amount of the polyisocyanate compound to be used is preferably within a range of from 80 to 120 as represented by 100 times of the number of isocyanate groups to the total of all active hydrogen of the polyoxyalkylene polyol, the crosslinking agent, water, etc. (usually, this numerical value represented by 100 times, is called isocyanate index), particularly preferably within a range of from 85 to 110.

In the present invention, the blowing agent is preferably at least one member selected from water and an inert gas. Specifically, as the inert gas, air, nitrogen or liquefied carbon dioxide, may, for example, be mentioned. The amount of such a blowing agent to be used, is not particularly limited. In a case where only water is used as the blowing agent, it is preferably at most 10 parts by mass, particularly preferably from 0.1 to 8 parts by mass, per 100 parts by mass of the total of the polyoxyalkylene polyol and other high molecular weight active hydrogen compound. Other blowing agents may be used in a proper amount depending upon the requirements such as the foaming ratio.

A catalyst is used at the time of reacting the polyoxyalkylene polyol with the polyisocyanate compound. In order to prevent the fogging phenomenon (fogging) of an automobile glass which has been recognized as a problem in recent years, it is preferred to use a catalyst having a low sublimation property. Specifically, an amine compound, an organic metal compound or a reactive amine compound, is, for example, preferred. The reactive amine compound is a compound having a part of the structure of an amine compound hydroxylated or aminated so that it is reactive with an isocyanate group. Further, an oligomerization catalyst to react isocyanate groups of e.g. metal carboxylates to one another, may be used, as the case requires.

Specific examples of the reactive amine compound include dimethylethanolamine, trimethylaminoethylethanolamine and dimethylaminoethoxyethoxyethanol.

The amine compound catalyst is used in an amount of preferably at most 1.0 part by mass, particularly preferably from 0.05 to 1.0 part by mass, per 100 parts by mass of the high molecular weight active hydrogen compound.

As the organic metal compound catalyst, an organic tin compound, an organic bismuth compound, an organic lead compound, an organic zinc compound, etc. may be mentioned. Specifically, it may, for example, be di-n-butyltin oxide, di-n-butyltin dilaurate, di-n-butyltin, di-n-butyltin diacetate, di-n-octyltin oxide, di-n-octyltin dilaurate, monobutyltin trichloride, di-n-butyltin dialkylmercaptan, or di-n-octyltin dialkylmercaptan. The organic metal compound type catalyst is used in an amount of preferably at most 1.0 part by mass, particularly preferably from 0.005 to 1.0 part by mass, per 100 parts by mass of the high molecular weight active hydrogen compound.

Further, it is also preferred to use a foam stabilizer to form good foams. The foam stabilizer may, for example, be a silicone type foam stabilizer or a fluorine-type foam stabilizer. The foam stabilizer is used in an amount of preferably from 0.1 to 10 parts by mass per 100 parts by mass of the total of the polyoxyalkylene polyol and other high molecular weight active hydrogen compound. As other optionally employed additives, a filler, a stabilizer, a colorant, a flame retardant, a cell opener, etc., may, for example, be mentioned.

The flexible polyurethane foam is preferably produced by a reaction in a closed mold having a reactive mixture of the above respective components injected therein. For example, it is preferred to employ a method wherein the reactive mixture is injected into the mold by means of a low pressure foaming machine or a high pressure foaming machine, i.e. a method wherein the reactive mixture is placed in the mold in an open state and then the mold is closed. The high pressure foaming machine is preferably of a type wherein two liquids are mixed, of which one liquid contains the polyisocyanate compound, and the other liquid is a mixture of all starting materials except for the polyisocyanate compound. In some cases, the reactive mixture may be formed by a total of three components including a catalyst or a cell opener (usually employed as dispersed or dissolved in a part of the high molecular weight polyol) as a separate component, and injected.

The reaction temperature of the present invention is preferably from 10 to 40° C. If it is lower than 10° C., the viscosity of the starting material increases substantially, and the liquid mixing of the reaction solution deteriorates. If it exceeds 40° C., the reactivity increases substantially, and the molding property, etc., will deteriorate.

The core density of the flexible polyurethane foam obtained by the present invention, is preferably at most 55 kg/m$^3$, more preferably at most 52 kg/m$^3$. Here, the core density is an apparent density of the cutout portion except for the surface of the flexible polyurethane foam.

Further, the flexible polyurethane foam obtained by the present invention has a resonance frequency of at most 3.7 Hz, a resonance ratio of at most 3.5 and an impact resilience of at most 70%. The impact resilience is preferably at most 65%. Further, the flexible polyurethane foam obtained by the present invention has durability, and one having a hysteresis loss value of at most 22% is preferred.

The flexible polyurethane foam produced by the present invention is useful for a seat cushion for automobiles, but its application is not limited thereto. As another application field, railroad vehicles, etc. may, for example, be mentioned.

EXAMPLES

Now, the present invention will be described in detail with reference to Examples, but the present invention is not limited thereto. Further, in Examples and Comparative Examples, the numerical values in the foam formulations, represent mass %.

The initiator average number of functional groups (the number of active hydrogen atoms or the number of hydroxyl groups), the oxyethylene (EO) group content (mass %), the propylene oxide/ethylene oxide random addition structure content, the polymerization catalyst, the hydroxyl value (mgKOH/g) and the unsaturation value (meq/g) of polyoxyalkylene polyols A1 to B-6 used in Examples and Comparative Examples, are shown in Table 1.

(1) Polyoxyalkylene Polyol (A)

A-1, A-2: A polyoxyalkylene polyol produced by reacting propylene oxide to the initiator in the presence of potassium hydroxide as a catalyst, and finally reacting ethylene oxide, followed by purification.

A-3: A polyoxyalkylene polyol produced by reacting propylene oxide to the initiator in the presence of cesium hydroxide as a catalyst, and finally reacting ethylene oxide, followed by purification.

A-4, A-5: A polyoxyalkylene polyol produced by mixing predetermined amounts of propylene oxide and ethylene oxide to the initiator, in the presence of potassium hydroxide as a catalyst, then introducing and reacting the mixture in the reactor, and finally reacting ethylene oxide, followed by purification.

(2) Polyoxyalkylene Polyol (B)

B-1 to B-3, B-6: A polyoxyalkylene polyol produced by mixing predetermined amounts of propylene oxide and ethylene oxide to the initiator in the presence of a zinc hexacyanocobaltate complex (DMC) as a catalyst, then introducing and reacting the mixture in the reactor, and finally reacting ethylene oxide in the presence of potassium hydroxide as a catalyst, followed by purification.

B-4 to B-5: A polyoxyalkylene polyol produced by reacting propylene oxide to the initiator in the presence of a zinc hexacyanocobaltate complex (DMC) as a catalyst, and finally reacting ethylene oxide in the presence of potassium hydroxide as a catalyst, followed by purification.

(3) Fine Polymer Particle-dispersed Polyol

C-1: A fine polymer particle-dispersed polyol having a fine polymer particle content of 35 mass %, obtained by addition polymerization of acrylonitrile monomer and styrene monomer (acrylonitrile/styrene: 75/25 by mass ratio) in polyoxyalkylene polyol A-1 in the presence of radicals, followed by stable dispersion.

C-2: A fine polymer particle-dispersed polyol having a fine polymer particle content of 35 mass %, obtained by addition polymerization of acrylonitrile monomer and styrene monomer (acrylonitrile/styrene: 75/25 by mass ratio) in a mixture of polyoxyalkylene polyols A-1 and B-1 in a mass ratio of 54/64 in the presence of radicals, followed by stable dispersion.

C-3: A fine polymer particle-dispersed polyol having a fine polymer particle content of 35 mass %, obtained by addition polymerization of acrylonitrile monomer and styrene monomer (acrylonitrile/styrene: 75/25 by mass ratio) in polyoxyalkylene polyol A-5 in the presence of radicals, followed by stable dispersion.

(4) Crosslinking Agent

D-1: A polyoxyalkylene polyol (molecular weight: 750, hydroxyl value: 450 mgKOH/g) having propylene oxide, then ethylene oxide, added by using sorbitol as an initiator.

D-2: Glycerol

D-3: Diethanolamine (5) Catalyst

E-1: A 33% dipropylene glycol (DPG) solution of triethylenediamine (tradename: TEDA L33, manufactured by TOSOH CORPORATION).

E-2: A 70% DPG solution of bis-(2-dimethylaminoethyl) ether (tradename: TOYOCAT ET, manufactured by TOSOH CORPORATION).

(6) Silicon Foam Stabilizer

F-1: Tradename SF-2962 (manufactured by Toray Dow Corning Silicone Co.).

(7) Blowing Agent

G: Water (8) Polyisocyanate Compound

H-1: A mixture of TDI-80 and crude MDI in a mass ratio of 80/20 (tradename: CORONATE 1021, manufactured by Nippon Polyurethane Industry Co., Ltd.).

H-2: TDI-80 (tradename: CORONATE T-80, manufactured by Nippon Polyurethane Industry Co., Ltd.).

Further, in Tables 2 and 4, the amount of the polyisocyanate compound used is represented by the isocyanate index (100 times of the equivalent ratio).

Examples 1 to 10 and Comparative Examples 1 to 6

Using the starting materials and the amounts as identified in Tables 2 and 4, a mixture of all materials other than the polyisocyanate compound and a polyisocyanate compound solution were, respectively, adjusted to have liquid temperatures of 25±1° C., and to the polyoxyalkylene polyol-containing mixture, a predetermined amount of a polyisocyanate compound was added, followed by stirring and mixing by a high speed mixer for 5 seconds. The mixture was immediately poured into an aluminum mold of 400 mm in length, 400 mm in width and 100 mm in height, heated to 60° C., and the mold was closed. After curing for 6 minutes, a flexible polyurethane foam was taken out and left to stand for at least 24 hours, whereupon various physical properties of the foam were measured. The measured results are shown in Tables 3 and 5. Further, for the moldability, a crushing property was evaluated which is a basis for an operation of compressing the foam to 25% of the thickness of the foam immediately after the molding and releasing foam cells, whereby ○ indicates "good", and Δ "slightly inferior". Further, the methods for measuring the physical properties of the foam were in accordance with the following standards, and with respect to the core density, one cut out in a size of 100 mm in length, 100 mm in width and 50 mm in height from the center portion of the foam except for the skin portion, was measured.

The overall density, the core density, the hardness (25% ILD), the (core) impact resilience, the elongation, the tensile strength, the tear strength, the dry heat compression set, the wet heat compression set: JIS K6400.

The resonance frequency, the resonance ratio, the 6 Hz transmissibility, the hysteresis loss: JISO B407-87 vibrational amplitude: ±2.5 mm, pressure plate: tekken model (load: 490 N)

TABLE 1

| Polyoxyalkylene polyol | Initiator average number of functional groups | EO content (mass %) | Random addition structure content (mass %) | Polymerization catalyst | Hydroxyl value (mgKOH/g) | Unsaturation value (meq/g) |
|---|---|---|---|---|---|---|
| A-1 | 3 | 15 | 0 | KOH | 34 | 0.088 |
| A-2 | 3 | 15 | 0 | KOH | 28 | 0.092 |
| A-3 | 3 | 16 | 0 | CsOH | 24 | 0.032 |
| A-4 | 2.61 | 33.9 | 26.7 | KOH | 43 | 0.065 |
| A-5 | 3 | 63 | 43 | KOH | 28 | 0.064 |
| B-1 | 2.5 | 40 | 30 | DMC | 27 | 0.019 |
| B-2 | 2.4 | 44.4 | 35.6 | DMC | 27.2 | 0.018 |
| B-3 | 2.85 | 34.3 | 13.5 | DMC | 28.7 | 0.010 |
| B-4 | 3 | 15 | 0 | DMC | 28 | 0.021 |
| B-5 | 3 | 23 | 0 | DMC | 28 | 0.019 |
| B-6 | 2.15 | 65.5 | 61.8 | DMC | 37 | 0.013 |

TABLE 2

| Starting Material components | Examples | | | | | | | | | |
|---|---|---|---|---|---|---|---|---|---|---|
| | 1 | 2 | 3 | 4 | 5 | 6 | 7 | 8 | 9 | 10 |
| A-1 | 44 | | | | 26 | 44 | 26 | 60 | 44 | |
| A-2 | | 42 | | 47 | | | | | | |
| A-3 | | | 42 | | | | | | | 32 |
| A-4 | | | | | | | | 14 | | |
| B-1 | 16 | | | | | | | | 16 | |
| B-2 | | 18 | 18 | 18 | | | | | | 18 |
| B-3 | | | | | 34 | | | | | |
| B-4 | | | | | | 9 | 20 | | | |
| B-6 | | | | | | 7 | | | | |
| C-1 | 40 | 40 | 40 | 35 | 40 | 40 | 40 | | 40 | 50 |
| C-2 | | | | | | | | 40 | | |
| D-1 | 3 | 3 | 3 | 2 | 3 | 3 | 3 | | | |
| D-2 | | | | | | | | 1.5 | 1.5 | 1.5 |
| E-1 | 0.45 | 0.45 | 0.45 | 0.45 | 0.45 | 0.45 | 0.45 | 0.45 | 0.45 | 0.45 |
| E-2 | 0.1 | 0.1 | 0.1 | 0.1 | 0.1 | 0.1 | 0.1 | 0.1 | 0.1 | 0.1 |
| F | 1.5 | 1.5 | 1.5 | 1.5 | 1.5 | 1.5 | 1.5 | 1.5 | 1.5 | 1.5 |
| G | 3 | 3 | 3 | 2.6 | 3 | 3 | 3 | 3 | 2.8 | 3 |
| H-1 | 105 | 105 | 105 | 105 | 105 | 105 | 105 | | 105 | 105 |
| H-2 | | | | | | | | 105 | | |

TABLE 3

| Physical properties | Examples | | | | | | | | | |
|---|---|---|---|---|---|---|---|---|---|---|
| | 1 | 2 | 3 | 4 | 5 | 6 | 7 | 8 | 9 | 10 |
| Evaluation of crushing property | ○ | ○ | ○ | ○ | ○ | ○ | ○ | ○ | ○ | ○ |
| Overall density (kg/m$^3$) | 56.1 | 57.1 | 56.2 | 60.2 | 55.9 | 56.5 | 56.3 | 56.8 | 56.3 | 51.9 |
| Core density (kg/m$^3$) | 51.2 | 51.8 | 51.8 | 54.8 | 51.2 | 51.4 | 51.4 | 51.7 | 51.4 | 46.1 |
| Hardness (25% ILD) (N/314 cm$^2$) | 235 | 232 | 229 | 234 | 254 | 240 | 249 | 238 | 232 | 198 |
| Impact resilience (core) (%) | 61 | 63 | 65 | 64 | 61 | 60 | 65 | 62 | 63 | 61 |
| Elongation (%) | 108 | 102 | 104 | 107 | 101 | 102 | 102 | 103 | 119 | 103 |
| Tensile strength (kPa) | 179 | 177 | 166 | 181 | 148 | 170 | 152 | 157 | 181 | 185 |
| Tear strength (N/cm) | 7.16 | 6.96 | 6.86 | 6.81 | 6.47 | 6.98 | 6.72 | 6.47 | 7.26 | 5.78 |
| Dry heat compression set (%) | 3.1 | 3.0 | 2.7 | 2.7 | 2.7 | 3.2 | 3.2 | 3.2 | 3.2 | 3.5 |
| Wet heat compression set (%) | 10.8 | 10.3 | 9.4 | 8.8 | 9.5 | 10.8 | 10.7 | 10.5 | 10.6 | 10.8 |
| Resonance frequency (Hz) | 3.57 | 3.50 | 3.40 | 3.45 | 3.55 | 3.60 | 3.60 | 3.56 | 3.53 | 3.63 |
| Resonance ratio | 2.91 | 3.45 | 3.4 | 3.21 | 3.10 | 2.80 | 3.46 | 2.94 | 3.07 | 2.65 |

TABLE 3-continued

| Physical properties | Examples | | | | | | | | | |
|---|---|---|---|---|---|---|---|---|---|---|
| | 1 | 2 | 3 | 4 | 5 | 6 | 7 | 8 | 9 | 10 |
| 6 Hz transmissibility | 0.88 | 0.76 | 0.74 | 0.71 | 0.88 | 0.90 | 0.87 | 0.85 | 0.82 | 0.92 |
| Hysteresis loss (%) | 19.8 | 18.5 | 17.3 | 17.3 | 20.8 | 20.5 | 20.9 | 19.6 | 18.9 | 20.8 |

TABLE 4

| Starting material component | Comparative Example | | | | | |
|---|---|---|---|---|---|---|
| | 1 | 2 | 3 | 4 | 5 | 6 |
| A-1 | 60 | | 30 | 30 | | |
| A-3 | | 60 | | | | |
| A-4 | | | | 30 | | |
| A-5 | | | | | 30 | |
| B-4 | | | | | 60 | |
| B-5 | | | 30 | | | |
| B-6 | | | | | | 30 |
| C-1 | 40 | 40 | 40 | 40 | 40 | |
| C-3 | | | | | | 40 |
| D-1 | 3 | 3 | 2 | 3 | 3 | 3 |
| D-3 | | | 1 | | | |
| E-1 | 0.45 | 0.45 | 0.45 | 0.55 | 0.45 | 0.55 |
| E-2 | 0.1 | 0.1 | 0.1 | 0.1 | 0.1 | 0.1 |
| F | 1 | 1 | 1 | 1 | 1 | 1 |
| G | 3 | 3 | 3 | 3 | 3 | 3 |
| H-1 | 105 | 105 | 105 | 105 | 105 | 105 |

TABLE 5

| Physical properties | Comparative Examples | | | | | |
|---|---|---|---|---|---|---|
| | 1 | 2 | 3 | 4 | 5 | 6 |
| Evaluation of crushing property | ◯ | ◯ | ◯ | ◯~Δ | ◯ | ◯ |
| Overall density (kg/m$^3$) | 55.1 | 56.5 | 56.3 | 55.9 | 56.0 | 56.2 |
| Core density (kg/m$^3$) | 51.8 | 51.3 | 51.2 | 51.0 | 51.2 | 51.8 |
| Hardness (25% ILD) (N/314 cm$^2$) | 231 | 221 | 234 | 245 | 230 | 210 |
| Impact resilience (core) (%) | 67 | 72 | 70 | 65 | 73 | 66 |
| Elongation (%) | 103 | 100 | 104 | 98 | 105 | 90 |
| Tensile strength (kPa) | 159 | 156 | 161 | 162 | 157 | 137 |
| Tear strength (N/cm) | 5.59 | 5.30 | 6.37 | 5.59 | 5.71 | 6.01 |
| Dry heat compression set (%) | 6.3 | 4.0 | 3.2 | 5.3 | 2.9 | 4.2 |
| Wet heat compression set (%) | 14.3 | 11.7 | 9.8 | 13.9 | 9.2 | 12.3 |
| Resonance frequency (Hz) | 3.80 | 3.50 | 3.51 | 3.80 | 3.45 | 3.77 |
| Resonance ratio | 4.10 | 4.65 | 4.11 | 4.11 | 4.25 | 4.22 |
| 6 Hz transmissibility | 1.06 | 0.81 | 0.79 | 0.90 | 0.76 | 0.97 |
| Hysteresis loss (%) | 23.1 | 20.9 | 19.6 | 24.2 | 18.3 | 23.9 |

As shown in Table 3, in Examples 1 to 9, flexible polyurethane foams having good physical properties, were produced, wherein the impact resilience (core) was at most 70%, the resonance frequency was at most 3.7 Hz, the resonance ratio was at most 3.5, and the dry heat compression set was at most 4%, the wet heat compression set was at most 11%, and the hysteresis loss was at most 21%. Comparative Examples 1 and 2 represent cases wherein the formulations did not contain a polyoxyalkylene polyol produced by using a zinc hexacyanocobaltate complex as a catalyst. In Comparative Example 1, the wet heat compression set, and the hysteresis loss were large, and the resonance frequency and the resonance ratio did not reach the desired values, and in Comparative Example 2, the impact resilience and the resonance ratio did not reach the desired values. Comparative Examples 3, 5 and 6 represent cases wherein a polyoxyalkylene polyol produced by using a zinc hexacyanocobaltate complex as a catalyst, was contained in each formulation. Comparative Examples 3 and 5 represent cases wherein no random addition structure was contained in the structure, whereby although the values of the wet heat compression set and the hysteresis loss, respectively, decreased thus showing the improvement of durability, but the resonance ratio did not reach the desired value. Comparative Example 6 represents a case where the random addition structure exceeds 45 mass %, based on the total polyoxyalkylene polyol, whereby the resonance frequency and the resonance ratio did not reach the desired values.

Comparative Example 4 represents a case wherein a polyoxyalkylene polyol containing 26.7% of the random addition structure, produced by using potassium hydroxide as a catalyst, was incorporated, whereby the resonance frequency and the resonance ratio did not reach the desired values, and the wet hot compression set and the hysteresis loss increased, whereby no improvement in durability was observed.

Industrial Applicability

The flexible polyurethane foam obtained by the present invention has low resilience, high vibration absorption and high durability and thus is useful for various applications including an application to a cushion material for automobile seats.

The entire disclosure of Japanese Patent Application No. 2000-114330 filed on Apr. 14, 2000 including specification, claims and summary is incorporated herein by reference in its entirety.

What is claimed is:

1. A process for producing a flexible polyurethane foam, which comprises reacting the following polyoxyalkylene polyol (C) and the following polyisocyanate compound in the presence of a catalyst and a blowing agent to produce a flexible polyurethane foam having a resonance frequency of at most 3.7 Hz, a resonance ratio of at most 3.5 and an impact resilience of at most 70%:

Polyoxyalkylene polyol (C): a polyoxyalkylene polyol which contains from 0.5 to 45 mass % of a random addition structure of ethylene oxide and an alkylene oxide having a carbon number of at least 3 in its structure and which further contains from 95 to 50 mass % of the following polyoxyalkylene polyol (A) and from 5 to 50 mass % of the following polyoxyalkylene polyol (B);

Polyoxyalkylene polyol (A): a polyoxyalkylene polyol produced by ring opening polymerization of a cyclic ether by means of an alkali metal catalyst;

Polyoxyalkylene polyol (B): a polyoxyalkylene polyol produced by ring opening polymerization of a cyclic ether by means of a double metal cyanide complex at least partially as a polymerization catalyst;

Polyisocyanate compound: a polyisocyanate compound containing from 0 to 50 mass % in total of a diphenylmethane diisocyanate and/or a polymethylenepolyphenyl isocyanate.

2. The process for producing a flexible polyurethane foam according to claim 1, wherein the polyoxyalkylene polyol (C) is a fine polymer particle-dispersed polyol.

3. The process for producing a flexible polyurethane foam according to claim 2, wherein the content of the fine polymer particles dispersed in the polyoxyalkylene polyol (C) is from 3 to 50 mass %.

4. The process for producing a flexible polyurethane foam according to claim 1, wherein the polyoxyalkylene polyol (A) has from 2 to 6 functional groups and a hydroxyl value of from 10 to 45 mgKOH/g.

5. The process for producing a flexible polyurethane foam according to claim 1, wherein the polyoxyalkylene polyol (B) has an unsaturation value of at most 0.04 meq/g, from 2 to 6 functional groups and a hydroxyl value of from 16 to 45 mgKOH/g, and has from 10 to 60 mass % of a random addition structure of ethylene oxide and propylene oxide in its structure.

6. The process for producing a flexible polyurethane foam according to claim 1, wherein the polyoxyalkylene polyol (C) has an unsaturation value of at most 0.09 meq/g, from 2 to 6 functional groups and a hydroxyl value of from 10 to 45 mgKOH/g.

7. The process for producing a flexible polyurethane foam according to claim 1, wherein the total content of oxyethylene groups in the structure of the polyoxyalkylene polyol (C) is from 3 to 80 mass %.

8. The process for producing a flexible polyurethane foam according to claim 1, wherein the core density of the flexible polyurethane foam is at most 55 kg/m$^3$.

9. The process for producing a flexible polyurethane foam according to claim 1, wherein the blowing agent is at least one member selected from water and an inert gas.

* * * * *